No. 845,247. PATENTED FEB. 26, 1907.
F. E. MOREHOUSE.
CORN PLANTER MARKER.
APPLICATION FILED DEC. 15, 1906.
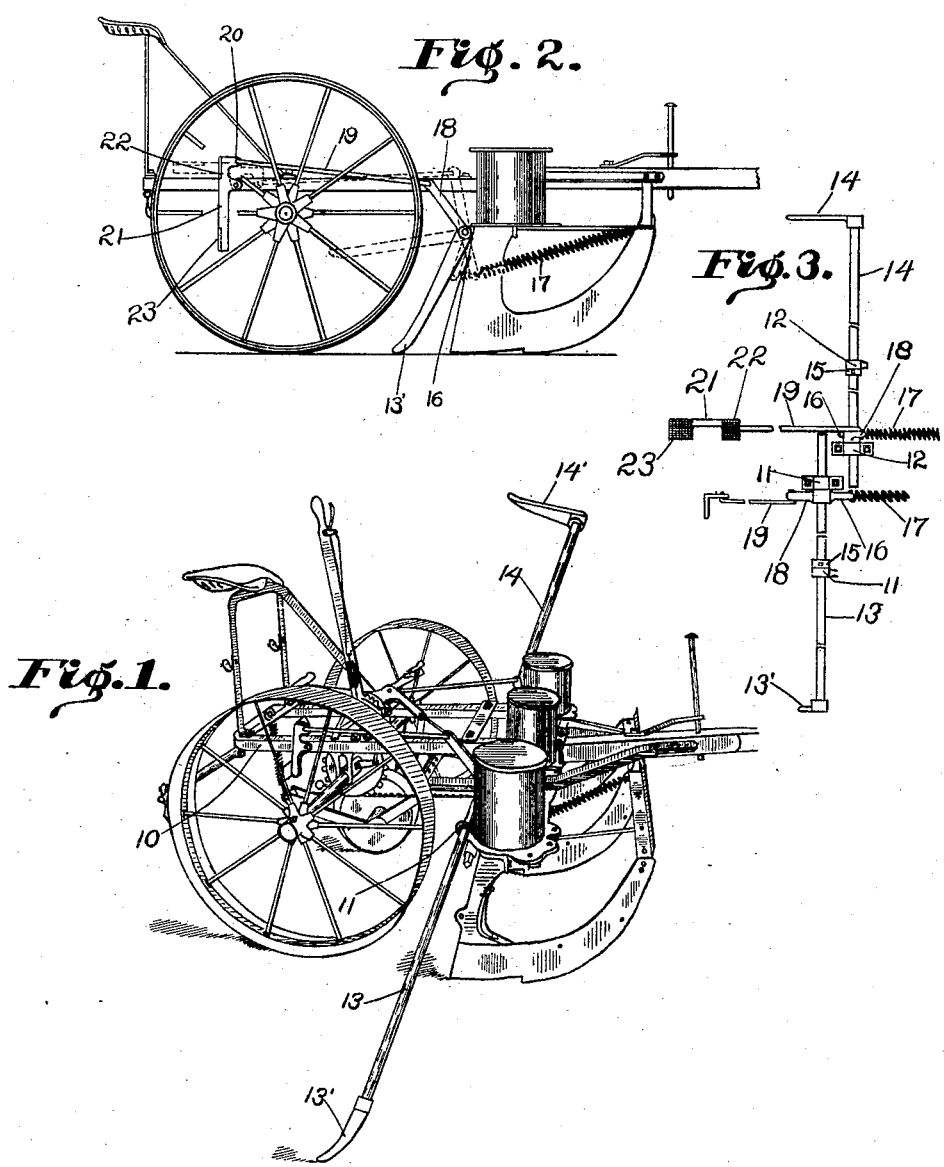
Witnesses
Inventor
Frederick E. Morehouse,
By Bradford & Hood.
Attorneys

UNITED STATES PATENT OFFICE.

FREDRICK E. MOREHOUSE, OF REYNOLDS, INDIANA.

CORN-PLANTER MARKER.

No. 845,247.  Specification of Letters Patent.  Patented Feb. 26, 1907.

Application filed December 15 1906. Serial No. 348,000.

*To all whom it may concern:*

Be it known that I, FREDRICK E. MOREHOUSE, a citizen of the United States, residing at Reynolds, in the county of White and State of Indiana, have invented certain new and useful Improvements in Corn-Planter Markers, of which the following is a specification.

The object of my invention is to provide a marking attachment for seed-planter, the construction being such that the parts may be readily operated without reversal.

The accompanying drawings illustrate my invention.

Figure 1 is a perspective view of a corn-planter equipped with my invention. Fig. 2 is a side elevation thereof; Fig. 3, a partial plan.

In the drawings, 10 indicates the frame of a planter of any desired type. Secured to the frame 10 are two pairs of bearing-brackets 11 11 and 12 12, the bearings 11 being adapted to receive a marker rock-shaft 13, projected from one side of the machine, and the bearings 12 being adapted to receive a corresponding shaft 14, projecting from the other side of the machine. The shaft 13 carries a marking-finger 13' at its outer end, and the shaft 14 carries a similar finger 14'. Each shaft is axially adjustable in its bearings and is held in any desired amount of projection by means of suitable adjustable collars 15, which lie between the bearing-brackets. Secured to shaft 13 is an arm 16, to which one end of a spring 17 is attached, the opposite end of said spring being attached to a portion of the frame and the arrangement being such that the spring tends to draw the end of finger 13' down into engagement with the ground. The arm 16 is axially adjustable on the shaft 13 and carries an operating-arm 18, to the outer end of which is connected one end of the link 19. The opposite end of link 19 is connected at 20 to a foot-lever 21, pivoted at an intermediate point in its length to a part of frame 10. Foot-lever 21 is provided with foot-pieces 22 and 23 at opposite ends, the arrangement being such that with the parts in position shown in Fig. 2 forward pressure upon the foot-piece 22 will swing the lever 21, so as to swing the arm 18 to the right, and thus withdraw finger 13' from operative position, as indicated in dotted lines, the point 20 passing slightly below the line between the pivotal point of the lever 21 and the point of connection 19 with arm 18, so that when the parts are in this position the spring 17 will tend to hold them against accidental displacement. Rock-shaft 14 is provided with an arm 16 and spring 17 and is also provided with arm 18, connected by a link 19 with a foot-lever 21.

In operation each shaft 13 and 14 may be axially adjusted so as to be projected a desired distance laterally from the machine-frame, and the operator will then throw the finger 13' or 14' on the unplanted side down to operative position, the other finger being raised out of operative position. When the end of the field is reached, the marking-finger which has been in operation is readily withdrawn by a pressure upon the end 22 of its lever 21. The machine is then turned around and the other marking-finger thrown down to operative position by pressure upon the rear end of the other lever 21. It will thus be noticed that no time is lost in setting the machine for the new direction in motion, nor is there any possibility of clods which cling to the marking-finger being thrown down upon the operator.

I claim as my invention—

1. A marking attachment for corn-planters, comprising a transverse rock-shaft, a marking-finger carried thereby, a spring urging said rock-shaft in a direction to carry the marking-finger to operative position, an operating member, and intermediate connections between said member and said shaft whereby the aforesaid spring may serve to maintain the marking-finger either in operative or inoperative position.

2. A marking attachment for corn-planters comprising a transverse rock-shaft, a marking-finger carried thereby, a spring urging said rock-shaft in a direction to carry the marking-finger to operative position, an arm attached to said rock-shaft, a pivoted foot-lever, and a link connecting said arm and foot-lever, the point of attachment of said link to the foot-lever being capable of passing either side of the line between the pivotal point of the foot-lever and the point of attachment of the link to the rock-shaft arm, whereby the link will serve to hold the marking-finger in either operative or non-operative position.

In witness whereof I have hereunto set my hand and seal at Reynolds, Indiana.

FREDRICK E. MOREHOUSE. [L. S.]

Witnesses:
JOHN B. RAY,
CHARLES B. HOOVER.